John# UNITED STATES PATENT OFFICE.

JOSEPH SMITH, OF SALT LAKE CITY, UTAH.

PROCESS OF TREATING GOLD OR SILVER ORES.

SPECIFICATION forming part of Letters Patent No. 635,199, dated October 17, 1899.

Application filed April 7, 1899. Serial No. 712,104. (No specimens.)

*To all whom it may concern:*

Be it known that I, JOSEPH SMITH, of Salt Lake City, in the county of Salt Lake and State of Utah, have invented a new and useful Improvement in Processes of Treating Gold or Silver Ores, of which the following is a full, clear, and exact description.

My invention relates to an improved preliminary treatment of gold and silver ores, tailings, or slimes containing free acids or acid salts soluble in water or acid salts insoluble in water before they are treated in the usual manner by the well-known cyanid process.

The usual treatment of such material is as follows: The material after being crushed to suitable size, if crushing is needed, is charged into a suitable sized vat and is then washed with water until the water that has percolated through the charge is free from acid, which shows that the free acid and the acid salts soluble in water have been removed. Then in order to decompose the acid combined in compounds insoluble in water either a caustic-soda or caustic-lime solution is run in. If caustic lime is used and the material contains ferrous-sulfate compound insoluble or very slowly soluble in water alone, the following reaction occurs:

$$FeSO_4 + Ca(OH)_2 = Fe(OH)_2 + CaSO_4,$$

or, in other words, the acid present combines with the lime and ferrous hydrate, $Fe(OH)_2$, is deposited in the material. If the ore is very acid, it is removed from the tank in which it has been treated with the caustic lime or caustic soda into another tank, it being claimed that the contact that the material thus gets while being moved from one tank to another with the air is sufficient to oxidize the ferrous salt present to the ferric hydrate. After the foregoing treatment the ore is treated with a solution of potassium cyanid in the usual manner. Results from this treatment are rarely satisfactory. When the ore is washed with water only a good deal of finely-divided gold is also washed out and the loss of gold due to this case is seldom less than ten cents per ton and often as high as fifty cents per ton.

The ore treated with caustic soda or caustic lime in the manner described contains always ferrous hydrate, $Fe(OH)_2$, and undecomposed acid salts. This is due to the fact that the contact of air which the material received during such a treatment is insufficient to convert all the ferrous hydrate into ferric hydrate and the treatment is not continued long enough to give the time needed for the lime to decompose all the acid-containing salts. The ferrous hydrate consumes cyanid to no useful purpose, thus:

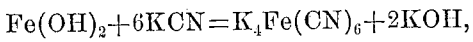
$$Fe(OH)_2 + 6KCN = K_4Fe(CN)_6 + 2KOH,$$

and the undecomposed salts are attacked by the potassium-cyanid solution, the potash in the solution combines with the acid, and the cyanogen passes off as the volatile hydrocyanic acid (HCN) thus:

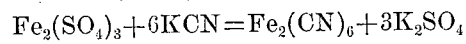
$$Fe_2(SO_4)_3 + 6KCN = Fe_2(CN)_6 + 3K_2SO_4$$

and

$$Fe_2(CN)_6 + 6H_2O = Fe_2(OH)_6 + 6HCN.$$

Thus it is easily seen that the material treated with alkaline solution in the usual manner consumes an enormous amount of potassium cyanid. Sometimes the amount of potassium cyanid thus consumed is so large that its cost exceeds the value of gold and silver extracted by its use from the ores under treatment. To this comes that under the most favorable circumstances the charge so treated will contain the ferric hydrate and if lime has been used the double hydrated lime sulfate, $(CaSO_4 + 2H_2O.)$ Both those compounds are slimy and voluminous and retard leaching and percolating when present only in very small quantities, and in case they are present to a considerable amount leaching out the gold solution becomes very slow and difficult and is always incomplete, so that, due to this, more gold and silver remain in the tailings. To this comes that the cyanid solutions become acid while in contact with such charges, and consequently the precipitation of gold and silver by the zinc is very incomplete. To obtain from said material a satisfactory extraction of gold and silver, to avoid the loss of gold and silver in the wash-water, to reduce the consumption of potassium cyanid to the normal amount—*i. e.*, the amount required by free cyaniding ores—to have a free leaching material, and to obtain a good precipitation of gold and silver in the zinc-boxes is the object of the invention, and to carry this into effect I proceed as follows: The material to be treated is tested in the usual way for the total acid present. Then the amount of caustic lime found necessary to neutralize the acids present is added. An excess does no harm. The mixing of the lime with the material to be treated may be done in any way most convenient under existing circumstances. For instance, if the quantity of material to be treated is small and is only slightly acid the needed lime may be added to it in the shape of lime-water, or in cases where the material has to be crushed then the lime may be fed with the ore to the crushing machinery. The ore or tailings thus mixed with lime is kept saturated with water in a dump or pile, or it is still better to put it into a pit and keep it covered by water. It is left in this condition until all the acid free and combined has combined with the lime and the iron has been changed to ferrous hydrate, which will require about from one to six months, or, in other words, till the ore has been completely neutralized, containing when an excess of lime has been used still some caustic lime, giving the mixture an alkaline reaction. For instance, the material under treatment contains ferrous-sulfate compounds. Then during the time it is kept saturated with water and the lime mixed with it the following changes take place:

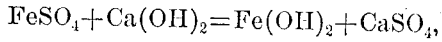
$$FeSO_4 + Ca(OH)_2 = Fe(OH)_2 + CaSO_4,$$

or, in other words, the caustic lime present combines with the acid in the iron salt and forms lime sulfate, while the iron is precipitated as ferrous hydrate. The ferrous hydrate so formed when it comes into contact with potassium cyanid consumes a large quantity of the latter. Thus

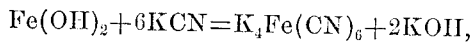
$$Fe(OH)_2 + 6KCN = K_4Fe(CN)_6 + 2KOH,$$

or, in other words, each equivalent of ferrous hydrate forms when the necessary amount of potassium cyanid is present one equivalent of ferrocyanid of potash and two equivalents of caustic potash, and thus consumes six equivalents of potassium cyanid to no useful purpose. To prevent this enormous consumption of cyanid, the ferrous hydrate must be removed. In order to effect this, the material treated as above containing it is then dried, and the water is drained off and can be used for treating another charge of ore. The material is then left exposed to the action of atmospheric air. During this drying process the ferrous hydrate, $Fe(OH)_2$, is first oxidized to the ferric hydrate, $Fe_2(OH)_6$. This latter compound does not combine with cyanogen, and its presence in cyanid solutions does therefore no harm. Then, secondly, the so-formed ferric hydrate loses its water of hydration and the anhydrous pulverulent ferric oxid is left. This ferric oxid ($Fe_2O_3$) is not acted upon by potassium cyanid. The lime sulfate formed while the caustic lime is in contact with the ore or tailings when saturated with water is in the form of the double hydrated lime sulfate, ($CaSO_4 + 2H_2O$.) During the drying this compound also loses its water of hydration and the pulverulent anhydrous lime sulfate ($CaSO_4$) is left. Any excess of caustic lime that may have been used and is yet present is converted, when in contact with the atmospheric air during the drying of the material, into the carbonate of lime, ($CaCO_3$.) Thus in drying the material before we subject it to the action of potassium cyanid not only the cyanid-consuming compounds are removed, but the slimy hydrous compounds present are converted into the pulverulent anhydrous compounds. Consequently when the material that has been treated in the manner given in the foregoing is then subjected to the action of potassium cyanid the extraction of gold and silver is good, the consumption of cyanid low, the material leaches freely, and the precipitation is good, and the consumption of zinc is not excessive, due to the fact that the excess of caustic lime has been converted into the carbonate.

The object of the preliminary treatment is to neutralize all acids present, or, in other words, to combine it with lime, which combination ($CaSO_4$) does not interfere with the action of potassium cyanid in the after treatment, and to remove the compounds formed that may consume potassium cyanid before the material is subjected to the action of the potassium cyanid. While this is partly and incompletely accomplished when the usual method of treatment is used, it is completely accomplished when the method of treatment as discovered by me is used.

Generally speaking, the acid to be dealt with is sulfuric acid in combination with iron. This is the reason why I have given reactions and changes occurring when these salts are brought into contact with caustic lime. However, other acids, such as arsenic, arsenious, &c., and their salts are met with. The reactions between those acids and the salts thereof and caustic lime are analogous to those with sulfuric acid and lime, and are therefore not given here.

Having thus described my invention, I claim as new and desire to secure by Letters Patent—

The herein-described process for treating gold and silver ores, tailings, slimes and like materials containing precious metals, which consists in mixing the material to be treated, with caustic lime, saturating or covering the mixture entirely with water and keeping it thus until all the acid present has combined with the lime, drying the material, exposing it to the action of atmospheric air, and treating it with a cyanid.

JOSEPH SMITH.

Witnesses:
S. T. PEARSON,
M. HISKEY.